United States Patent [19]
Lak et al.

[11] Patent Number: 6,073,450
[45] Date of Patent: Jun. 13, 2000

[54] COMBINED DIFFUSER AND RECIRCULATION MANIFOLD IN A PROPELLANT TANK

[75] Inventors: Tibor I Lak, Huntington Beach; Gene Rogers, San Pedro; James F. Weber, Moorpark; Michael V. Merlin, Anaheim; Timothy L. Gaynor, III, Cypress; John E. Davis, Claremont; David L. Gerhardt, Redondo Beach, all of Calif.

[73] Assignee: Boeing North American, Seal Beach, Calif.

[21] Appl. No.: 09/262,755

[22] Filed: Mar. 4, 1999

[51] Int. Cl.[7] .................................................. F17C 5/02
[52] U.S. Cl. ..................................... 62/47.1; 62/7
[58] Field of Search .......................... 62/7, 47.1

[56] References Cited

U.S. PATENT DOCUMENTS

| | | |
|---|---|---|
| 2,640,627 | 6/1953 | Doelter . |
| 3,191,395 | 6/1965 | Maher et al. ............................ 62/47.1 |
| 3,389,555 | 6/1968 | Goldstein et al. . |
| 5,315,530 | 5/1994 | Gerhardt et al. . |
| 5,398,515 | 3/1995 | Lak . |
| 5,644,920 | 7/1997 | Lak et al. . |

Primary Examiner—Ronald Capossela
Attorney, Agent, or Firm—Stout, Uxa, Buyan & Mullins, LLP; Donald E. Stout

[57] ABSTRACT

A cryogenic propellant tank system and process for densifying cryogenic liquid propellant comprises a tank with a combined manifold, a combined manifold line, a pressurizing gas line, and a vent line. The combined manifold is located in the tank. The combined manifold line functionally connects the combined manifold to a chilling system. The pressurizing gas line and the vent line are also functionally connected to the combined manifold line. The tank may be disposed in a vehicle. The manifold is disposed proximate the top of the tank. The chilling system may be a heat exchanger/filling system. The process for filling the tank comprises the steps of charging the tank with cryogenic liquid propellant, venting gases in the tank, densifying the cryogenic liquid propellant, and pressurizing the tank. The tank is charged with the cryogenic liquid propellant such that the orifices in the combined manifold are submerged. The gases in the tank are vented through the combined manifold and out of the tank. The venting step is arrested prior to the submerging of the combined manifold orifices. The liquid in the tank is densified by directing a recirculation stream of the cryogenic liquid propellant from the tank through the combined manifold, out of the tank, cooling and directing the recirculation stream back into the tank. The tank is pressurized by directing a pressurizing gas stream into the combined manifold and into the tank.

11 Claims, 1 Drawing Sheet

COMBINED DIFFUSER AND RECIRCULATION MANIFOLD IN A PROPELLANT TANK

BACKGROUND OF THE INVENTION

1. Field of the Invention

This invention relates to propellant storage and, more specifically, relates to densifying the stored propellant.

2. Description of the Related Art

Propulsion systems utilizing cryogenic propellants, such as liquid oxygen and liquid hydrogen, such as the Space Shuttle, Atlas/Centaur, Delta, etc., are currently filled from the facility storage tanks and subsequently allowed to cool in the flight tanks in order to reject the heat absorbed by the liquid as a result of environmental heat leak, transfer line, and tank wall chill-down. The cooling of the liquid bulk is desirable in order to increase the liquid density so that more impulse mass can be stored in the tank, and also to reduce the liquid vapor pressure so that the tank operating pressure and tank weight is minimized.

Heat rejection from the liquid bulk is a relatively slow process since it depends on natural convection mechanism and liquid surface evaporation. The degree of liquid cooling through surface evaporation is also limited by the vent system flow resistance (vent valve and line) and the ambient pressure (14.7 psia). Reducing the vent system flow resistance to improve the cool down time and minimize the final bulk temperature results in a relatively large vent valve and line design which represents a vehicle payload weight penalty. Although the current means of densifying the cryogenic liquids through evaporation are simple the process is limited to the saturation density and liquid vapor pressure at one atmosphere.

The prior art discloses systems that result in reduced weight of a vehicle with a propellant tank and reduced energy required to transport the vehicle. One such system is disclosed in U.S. Pat. No. 5,644,920 to Lak et al. entitled "Liquid Propellant Densification," which is incorporated by reference herein in its entirety.

The prior art also discloses the importance of maintaining propellant tank pressure before and during engine operation. Referring now to Prior Art FIG. 1, a prior art propellant tank 10 is partially filled with propellant 12 and has above the propellant an ullage 14. The tank 10 is filled with the propellant 12 through a transfer line 16 that directs the propellant from a heat exchanger/liquid filling system 18 to the bottom of the tank. The filling system 18 initially receives a propellant stream 20 to fill the tank 10.

The tank 10 has a manifold 22 for venting ullage gas from the tank 10 during the initial propellant charging process and drawing off warmer propellant 12 from the tank during the propellant densification process. The manifold 22 is shown in the upper half of the tank 10 and below the surface 24 of the propellant for densification. The manifold 22 is connected to a manifold line 26 that is also connected to the filling system 18. The manifold line 26 has a vent line 28 coming off of it. The manifold line 26 and the vent line 28 have valves 30 and 32, respectively, to control the flow of material through the lines. The valve 30 is located downstream of the tee for the vent line 28.

During the initial propellant charging process, the tank 10 is vented through the manifold 22. As the amount of the propellant 12 in the tank 10 increases, the ullage 14 decreases and needs to be vented. The ullage 14 is vented through the manifold 22 and out of the vent line 28. The manifold line valve 30 is closed and the vent line valve 32 is open to direct venting gas 34 out through the vent line 28. The venting through the manifold 22 continues until orifices 36 in the manifold are submerged, at which time the vent line valve 32 is closed. The initial propellant charging process continues until a predetermined full charge of propellant 12 is delivered to the tank 10.

After the initial propellant charging process, the propellant 12 is densified. The densification process involves removing propellant 12 from the tank 10, cooling the propellant, and directing it back into the tank. The manifold 22 is used to draw off propellant 12 and the propellant is directed through the manifold line 26 and the now open manifold line valve 30 and into the heat exchanger/filling system 18. The propellant 12 is cooled in the filling system 18 and directed back to the tanks 10 through the transfer line 16. The positioning of the manifold 22 in the upper portion of the tank 10 draws off propellant 12 that is warmer than propellant nearer the bottom of the tank.

After the densification process, the propellant tank 10 is pressurized. The tank 10 is isolated from the filling system 18 and the vent line 28. The propellant tank 10 is pressurized through pressurization gas 40 being introduced into the ullage 14 through a diffuser 42. The diffuser 42 is mounted in the tank 10 such that it is in the ullage.

The diffuser 42 is designed to direct the incoming pressurization gas 40 away from the propellant surface 24 and reduce heat transfer between the warmer gas and the cooler propellant 12. There are certain advantages to inhibiting heat transfer between the gas 40 and the propellant 12. The warmer pressurization gas 40 heats up the propellant 12, thereby detrimentally decreasing the propellant's density. The gas 40 cooled by the propellant 12 is denser, thereby requiring a detrimental increase in amount and weight of the pressurization gas tank to achieve the target tank pressure.

The pressurization gas 40 is directed to the diffuser 42 through a gas line 44. The gas line 44 has a gas line valve 46 that is closed during the initial propellant charging process.

The prior art design for a propellant tank requires two sets of piping, the manifold line 26 and the pressurization gas line 44. The prior art design also requires a manifold 22 for venting and recirculating and a separate diffuser for introducing pressurized gas 40 into the tank 10. A need exists for a system that combines the functions of the above items.

SUMMARY OF THE INVENTION

In an aspect of the invention, a propellant tank system comprises a combined manifold, a combined manifold line, a pressurizing gas line, and a vent line. The combined manifold is located in the propellant tank. The combined manifold line functionally connects the combined manifold to a propellant chilling system. The pressurizing gas line and the vent line are also functionally connected to the combined manifold line.

In a further aspect of the invention, a pressurizing gas line valve is functionally disposed in the pressurizing gas line and a vent line valve is functionally disposed in the vent. Further, a combined manifold line valve is functionally disposed in the combined manifold line downstream of where the pressurizing gas line and the vent line functionally connects to the combined manifold line.

In further aspects of the invention, the propellant tank is disposed in a vehicle, the manifold is disposed proximate a top of the propellant tank, and the propellant chilling system is a heat exchanger/filling system.

In an aspect of the invention, a process for charging a propellant tank comprises the steps of charging the propellant tank, venting gases in the propellant tank, densifying liquid propellant, and pressurizing the propellant tank. The propellant tank is charged with liquid propellant. The gases in the propellant tank are vented through orifices in the combined manifold, into the combined manifold, and out of the propellant tank. The venting step is arrested prior to the liquid propellant submerging the combined manifold orifices. The charging step continues such that the orifices are submerged. The liquid propellant in the propellant tank is densified by directing a recirculation stream of the liquid propellant from the propellant tank through the submerged combined manifold orifices, into the combined manifold, out of the propellant tank, cooling and directing the recirculation stream into the propellant tank. The propellant tank is pressurized by directing a pressurizing gas stream into the combined manifold, through the combined manifold orifices, and into the propellant tank, either during or after the densifying step.

In a further aspect of the invention, the venting step further comprises the step of directing the venting gases from the combined manifold, through a combined manifold line, and exiting the combined manifold line through a venting line.

In a further aspect of the invention, the densifying step further comprises the step of directing the liquid propellant from the combined manifold, through a combined manifold line, and into a propellant chilling system.

In a further aspect of the invention, the pressurizing step further comprises the step of directing the pressurizing gas stream through the combined manifold line and into the combined manifold.

A further aspect of the invention comprises the step of draining a portion of the liquid propellant from the propellant tank to expose combined manifold orifices to an ullage in the propellant tank.

In a further aspect of the invention, the combined manifold is disposed proximate the top of the propellant tank.

In a further aspect of the invention, liquid oxidizer is used in place of liquid propellant, with the tank system being for liquid oxidizer.

BRIEF DESCRIPTION OF THE DRAWINGS

Prior Art

DESCRIPTION OF THE PREFERRED EMBODIMENTS

Figure 1:
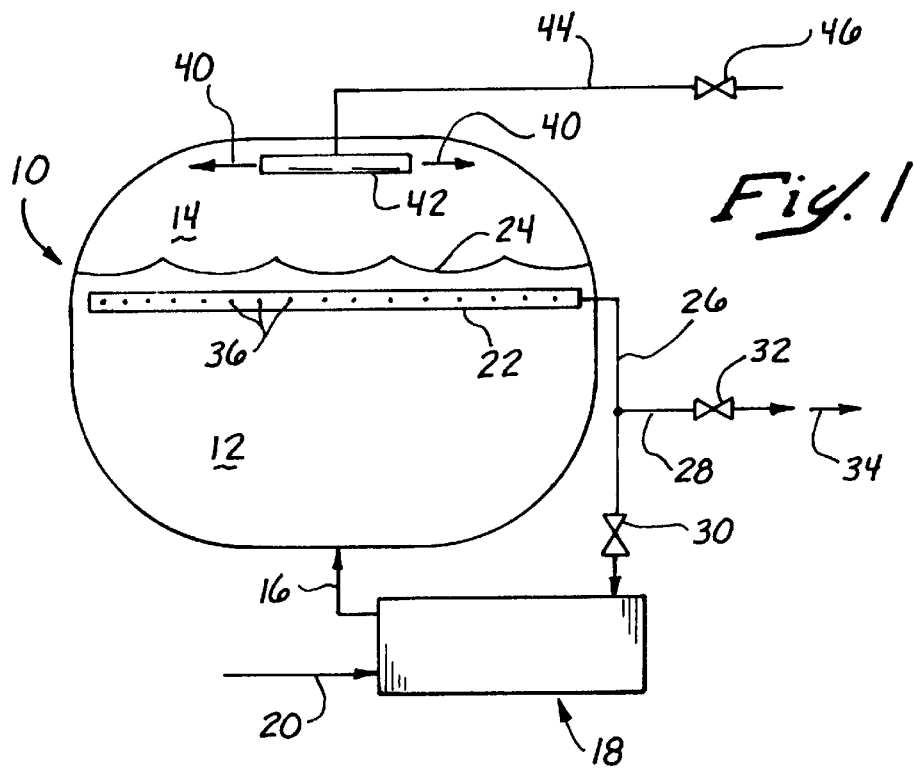
FIG. 1 shows a propellant tank according to the prior art.
Figure 2:
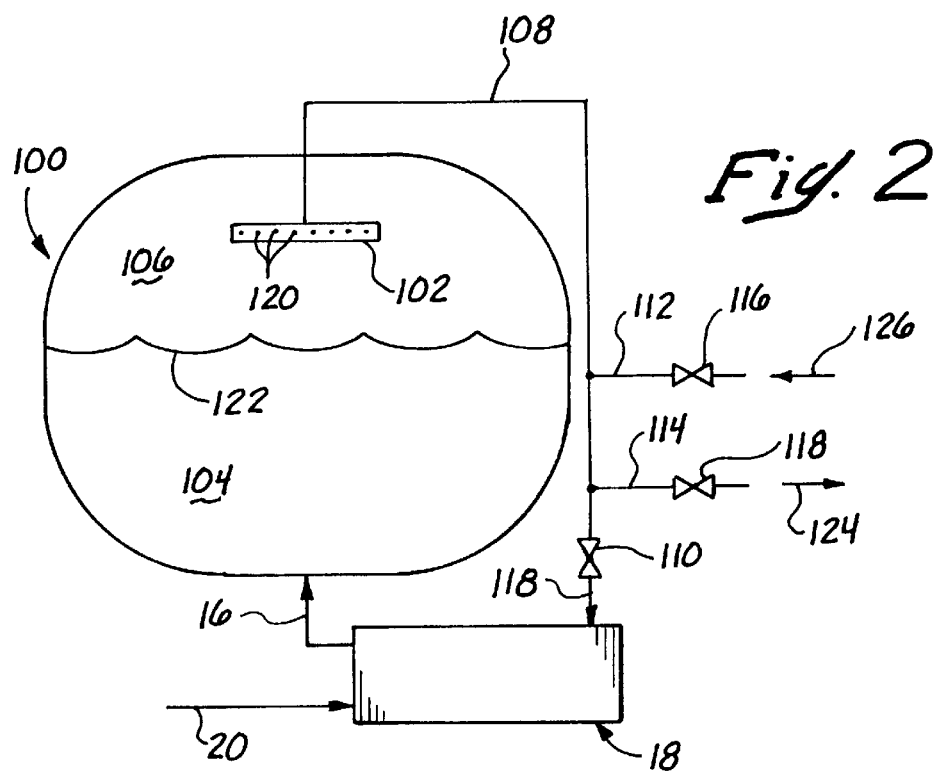
FIG. 2 shows a propellant tank with a combined manifold according to an embodiment of the invention.

Referring now to FIG. 2, a propellant tank 100 according to an embodiment of the invention has a combined manifold 102 that is used in the processes of venting, recirculating, and pressurizing the tank. The tank 100 is shown partially filled with propellant 104 and has above the propellant an ullage 106. The tank 100 is filled with the propellant 104 through the transfer line 16 that directs the propellant from the heat exchanger/liquid filling system 18 to the bottom of the tank. The filling system 18 initially receives the propellant stream 20 to fill the tank 100.

The combined manifold 102 is located in the top portion of tank 100. A combined manifold line 108 functionally connects the combined manifold 102 to the filling system 18 and has a valve 110 to control flow. Upstream of the manifold line valve 110 a pressurizing gas line 112 and a vent line 114 enter the manifold line 108. The pressurizing gas line 112 and the vent line 114 have respective valves 116 and 118 to control flow through the lines.

The process of charging the tank 100 comprises a charging, chilling, and venting gases step; an arresting the venting gases step; a densifying step; and a pressurization step.

In the charging, chilling, and venting step, the propellant tank 100 is filled with propellant 104 through the line 16. The venting step continues until the orifices 120 of the combined manifold 102 are submerged in the propellant 104. FIG. 2 shows the surface 122 of the propellant 104 below the combined manifold 102. As the tank 100 is being filled, the tank is chilled using systems and techniques known to those skilled in the art. The ullage 106 is vented through the combined manifold 102. The tank 100 is vented as propellant fills the tank. The vented gases 124 exit through the vent line 114. During the venting process, the manifold line valve 110 and the pressurization gas line valve 116 are closed and the vent line valve 118 is open. The vented gases 124 may be vented to an environmentally suitable capture device (not shown) for disposal, recovery, or recirculation.

In the arresting the venting gases step, the vent line valve 118 is closed prior to the combined manifold orifices 120 becoming submerged in the propellant 104. Embodiments of the invention may use any suitable system to determine when to initiate the arresting the venting gases step, including level indicators, volume determination systems, and the like.

In the densifying step, the propellant 104 flows through the combined manifold 102 and the combined manifold line 108. The flowing propellant 104 is then chilled in the heat exchanger/filling system 18 and recirculated back into the tank 100 through transfer line 16. The propellant is chilled and densified in the system 18. In some embodiments of the invention, the tank 100 may have to be pressurized prior to the densifying step, which may be the case when liquid hydrogen is the propellant 104.

During the densifying step, additional liquid propellant 104 may need to be added to the tank 100. As the liquid propellant 104 is densified, the volume in the tank 100 is maintained with additional liquid propellant 104 added through line 20 to the heat exchanger/liquid filling system 18 and fed back into the tank 100 through line 16.

An example of a chilling process using the heat exchanger/filling system 18 is disclosed in previously referenced and incorporated U.S. Pat. No. 5,6344,920. Embodiments of the invention may use any suitable propellant chilling system to cool and densify the propellant 104. For the step to occur, the combined manifold line valve 110 is open and the pressurizing gas valve 116 and the vent line valve 118 are closed. Additionally, the propellant surface 122 is above the combined manifold orifices 120 during the densifying step, such that the orifices are submerged.

In the pressurizing step, the pressure in the propellant tank 100 is increased by a pressurization gas stream 126 being directed through the combined manifold 102. In an embodiment of the invention, the manifold orifices 120 may be below the surface 122 during the pressurizing step, such as when pressurizing the tank 100 with helium prior to flight.

In another embodiment of the invention, the combined manifold orifices 122 are exposed to the ullage 106 prior to initiating the pressurizing step. In a preferred embodiment of the invention, the liquid propellant 104 is drained from the tank 100 to lower the top surface 120 and expose the orifices 122 to the ullage 106. The draining of the tank 100 may occur through the line 16 or through another line not shown.

During the pressurizing step, the combined manifold line valve 110 and the vent line valve 118 are closed and the pressurizing gas line valve 116 is opened. A pressurization gas stream 126 is directed through the pressurizing gas line 112, through the combined manifold line 108, and into the manifold 102. The pressurization gas stream 126 enters the tank ullage 106 and pressurizes the tank. In the preferred embodiment of the invention, the orifices 120 direct the incoming pressurization gas 126 away from the propellant surface 122 to reduce heat transfer between the gas 126 and the propellant 104.

The shown, and a preferred, embodiment of the invention reduces the weight of the pressurization tank system. The embodiment of the invention eliminates one of the fluid distribution devices by having a combined manifold instead of a manifold and a diffuser. Additionally, by having only the combined manifold, one less line going directly to the tank 100 is needed than what is disclosed in the prior art. This reduction in components of the system may result in a beneficial reduction of weight in a preferred embodiment of the invention.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A tank system for storing a cryogenic liquid propellant comprising:
    a. a combined manifold located in a tank;
    b. a combined manifold line functionally connecting the combined manifold to a cryogenic liquid chilling system;
    c. a pressurizing gas line functionally connected to the combined manifold line; and
    d. a vent line functionally connected to the combined manifold line.

2. The cryogenic propellant tank system of claim 1 further comprising:
    a. a pressurizing gas line valve being functionally disposed in the pressurizing gas line;
    b. a vent line valve being functionally disposed in the vent line; and
    c. a combined manifold line valve being functionally disposed in the combined manifold line downstream of where the pressurizing gas line and the vent line functionally connects to the combined manifold line.

3. The cryogenic propellant tank system of claim 1, wherein the tank is disposed in a vehicle.

4. The cryogenic propellant tank system of claim 1, wherein the manifold is disposed proximate a top of the tank.

5. The cryogenic propellant tank system of claim 1, wherein the liquid chilling system is a heat exchanger/filling system.

6. A process for filling a tank with a cryogenic liquid propellant comprising the steps of:
    a. charging the tank with the cryogenic liquid propellant to submerge orifices in a combined manifold that is disposed in the tank;
    b. venting gases in the tank through the combined manifold orifices, into the combined manifold, and out of the tank;
    c. arresting the venting step prior to the cryogenic liquid propellant submerging the combined manifold orifices;
    d. densifying the cryogenic liquid propellant in the tank by directing a recirculation stream of the cryogenic liquid propellant from the tank through the submerged combined manifold orifices, into the combined manifold, out of the tank, cooling the recirculation stream, and directing the recirculation stream back into the tank; and
    e. pressurizing the tank by directing a pressurizing gas stream into the combined manifold, through the combined manifold orifices, and into the tank.

7. The process of claim 6, wherein the venting step further comprises the step of directing the venting gases from the combined manifold, through a combined manifold line, and exiting the combined manifold line through a venting line.

8. The process of claim 6, wherein the densifying step further comprises the step of directing the cryogenic liquid propellant from the combined manifold, through a combined manifold line, and into a chilling system.

9. The process of claim 6, wherein the pressurizing step further comprises the step of directing the pressurizing gas stream through the combined manifold line and into the combined manifold.

10. The process of claim 6, further comprising the step of draining a portion of the cryogenic liquid propellant from the tank to expose combined manifold orifices to an ullage in the tank.

11. The process of claim 6, wherein the combined manifold is disposed proximate a top of the tank.

* * * * *